March 15, 1966  V. G. BIRO  3,240,244

MEAT SAW CARRIAGE GUIDE SYSTEM

Filed Oct. 18, 1963  2 Sheets-Sheet 1

INVENTOR.
Vincent G. Biro
BY
ATTORNEY

March 15, 1966 V. G. BIRO 3,240,244
MEAT SAW CARRIAGE GUIDE SYSTEM
Filed Oct. 18, 1963 2 Sheets-Sheet 2
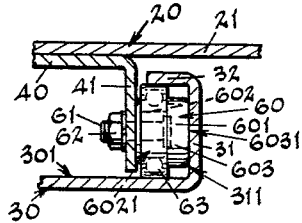
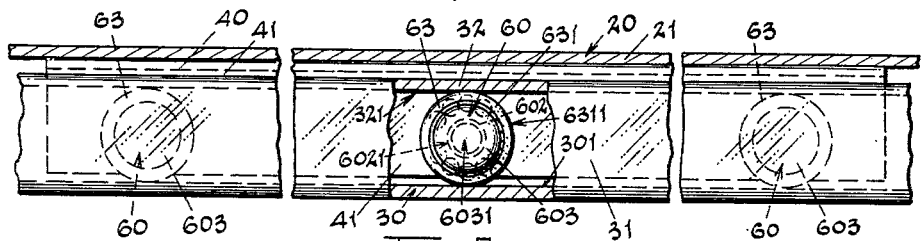
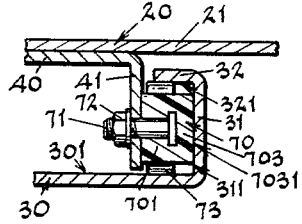
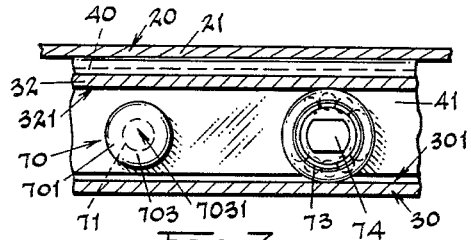
INVENTOR.
Vincent G. Biro
BY
ATTORNEY 3,240,244
MEAT SAW CARRIAGE GUIDE SYSTEM
Vincent G. Biro, Marblehead, Ohio, assignor to The Biro Manufacturing Company, Marblehead, Ohio, a corporation of Ohio
Filed Oct. 18, 1963, Ser. No. 317,254
2 Claims. (Cl. 143—25)

My invention concerns systems by which a work supporting and feeding plate or carriage is movably supported and guided, in movement relative to a working station. The system of my invention readily lends itself to meat sawing machines of the power driven band type shown in United States Letters Patent Nos. 2,081,033 and 2,104,360, issued May 18, 1937, and January 4, 1938, respectively, to Carl G. Biro.

On such machines, the work or meat cutter comprises a band-like saw blade supported in vertical flights between two spaced pulley sheaves of which one is usually power driven. One flight of the saw blade band is the working or cutting flight, in that the band edge of the blade in that flight is moved in a direction (usually downward) to cause the saw teeth thereon to make a cutting stroke. The meat to be cut is fed to that flight by resting on a plate or carriage that is supported for manually actuated, horizontal movement along one side of the saw cutting flight.

To gauge the thickness of the cut from the meat being worked and to guide the cutting for uniformity of cut thickness, a vertically extending gauge plate is customarily located on the other side of the cutting flight of the saw blade and provides a stop against which the meat to be cut is placed and held during cutting. Cutting being done as a consequence of the horizontal movement of the carriage and the meat supported thereon, the meat is caused to slide over and along the gauge plate.

In order to hold the meat being cut against movement on the feed carriage and, when the gauge plate is used, to insure that the meat engages the gauge plate throughout the cutting action, the operator commonly uses his own body pressure, communicated through his arms or hips, to urge the meat both downwardly on the carriage and laterally against the gauge plate as, at the same time, he moves the carriage laterally and relative to the cutting flight of the saw blade band. This body pressure exerted by the saw operator is transmitted to the carriage and to the means for movably supporting it, causing distorting and wearing stress on the carriage supporting means and resulting in early and extensive wear, rendering subsequent movement of the carriage relative to the cutter somewhat undependable.

To counteract the forces so exerted, it has been the practice, in some instances, to provide a plurality of downward extending, rigid travelers or shoes on the underside of the carriage, positioned that they extend into and bear on edges of a slot in an inverted channel track permanently fastened to the machine frame. Thus, the lateral or side urging pressures, as may have been exerted on the carriage, were transmitted to the slot edges of the channel track and through it to the machine frame. This arrangement relieved the carriage supporting means of stress and resultant wear. The disadvantage, however, in such arrangement was found to reside in the fact that meat debris and bone suet dust from saw cutting tended to become lodged in the channel track. This, unless removed regularly, at best a difficult task to accomplish because of the limited accessibility to the interior of the inverted channel track, allowed centers of contamination and spoilage to form from which traces were transmitted to and endangered the wholesomeness of meat brought in contact with the apparatus for subsequent cuttings.

This fault is among those recently studied by the National Sanitation Foundation, working through and in conjunction with the University of Michigan at Ann Arbor, Michigan. The Foundation concluded from such study that the trolley and track guide system, just described, presented too many hazards to health to be acceptable. Consequently, approval of apparatus incorporating such guide systems for cutting meat for public consumption has been and is being refused.

My invention proposes to meet these objections and has for its primary object to provide a carriage guide system and means therein by which no such centers of spoilage and contamination will develop. Further, it is the object of my invention to provide means that have a high degree of easy accessibility for cleaning, if such be necessary. Still further it is the object of the invention to provide means by which operating lateral pressures on the work carriage may be withstood and the carriage movement be kept to a dependable path over longer periods of time.

Therefore, it is the general object of my invention to provide a combination of elements in a system to support and guide a meat saw carriage that by their nature, form, and disposition are resistant not only to working pressures but also to practical operating pressures and which are self contained and impenetrable to the influx of meat debris and the like.

Another general object to the invention is to provide such systems and means therein at a low cost and of an easily installed and maintained simplicity. There are also other and more particular objects which my invention serves. These will appear from the description which follows.

Carriage guide means for meat cutters of the band saw variety containing my invention may take various forms, of which one, now appearing to me to the best by which my invention may be carried out, is described hereinafter and shown in the accompanying drawings. By making such description and alluding to the drawings during the course thereof, however, I do not imply that I am unaware of variations from the structure being described or shown which also embody my invention nor do I hereby disclaim such as beyond the contemplation of my invention as hereinafter made manifest.

The drawings, to which I have and will make further reference, contain views of which:

FIG. 4 is a view of a partial section, similar to that of FIG. 2, but showing a modified form of a carriage guide means;

FIG. 5 is a view of a section, similar to that of FIG. 3 but showing the modified form illustrated in FIG. 4;

FIG. 6 is a view of a partial section similar to that of FIG. 2 showing another modified form of a carriage guide means; and FIG. 7 is a view of a section, similar to that of FIG. 3 but showing the modified form shown in FIG. 6.

Figure 1:
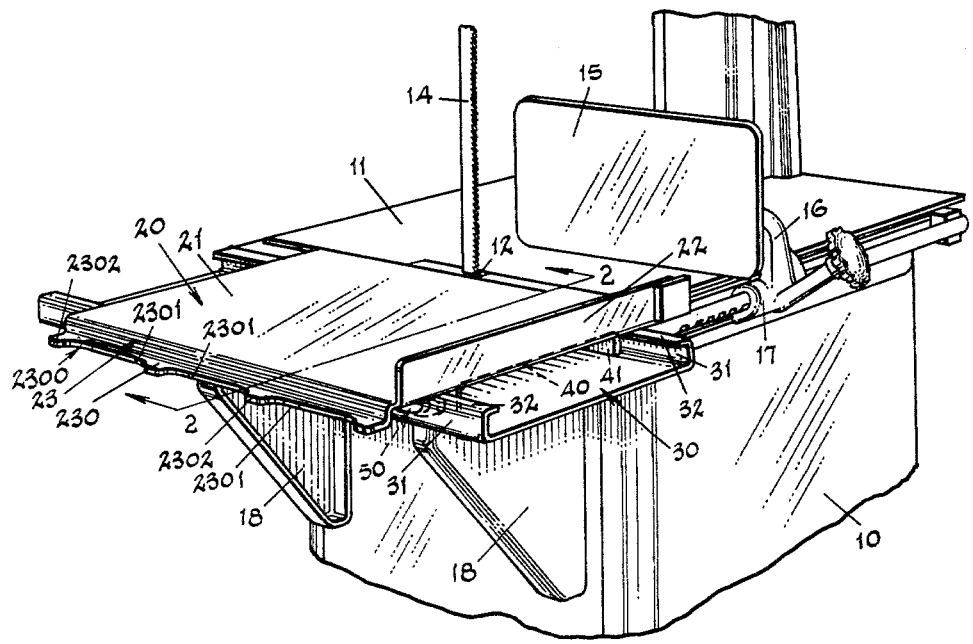
FIG. 1 is a perspective view of the frame or pedestal of a meat cutter machine on which a preferred form of a carriage guide means embodying my invention is shown, parts of the meat cutter machine and the pedestal being omitted because such are not necessary to this explanation.

Orientation in regard to the problem to which my invention is directed may be had by a consideration of FIG. 1 of the accompanying drawings. There, a portion of the frame or pedestal 10 of a power meat cutter machine is shown. The pedestal 10 has the usual horizontally extending top plate 11 in which the customary slot 12 is provided to accommodate a band saw 14 in downward flight and passage therethrough. A gauge plate 15 may be supported in superimposed relation to the top plate 11, as by arm 16 and an adjustment complex 17. The arm 16 holds the gauge plate vertically parallel to the flight of the band saw 14 and extending horizontally across the top plate along a line parallel to the band saw and its slot 12 in the top plate.

The pedestal 10 also has brackets 18 affixed to extend, in cantilever relation from the pedestal sides, to support parts I shall now describe for movably mounting a work feeding plate or carriage 20. In the particular form shown in the accompanying drawings, the carriage 20 has an upper flat work supporting surface 21 of considerable area that, by reason of the support of the carriage, extends in plane with the upper surface of the top plate 11. The work supporting surface 21 is bound, along one edge, by an upstanding curb or flange 22 that cooperates in retaining a meat slab being worked on the surface 21 and from sliding off the same.

The carriage 20 preferably has a second flange 23 that extends along and downwardly from an edge of the surface 21 adjacent the flange 22. The flange 23 has an eave or horizontally extending overhang 230. The outer edge of the overhang 230 may be scalloped or castellated, as at 2300, to provide bays 2301 between and alternating with spaced projections 2302. The bays and projections which define them provide spaces and rungs into and against which the machine operator may press body parts, such as the hip, to thereby engage and by hip or body movement move and control the carriage 20 in its movement relative to the saw blade 14. This frees the operator's hands for holding the meat being worked in place on the surface 21 and against the gauge plate 15.

These operator-exerted body and hand applied pressures to hold the meat being worked on the surface 21 and in a desired relation against the gauge plate 15, while advancing the carriage 20 to feed the meat to the cutting action against the saw blade, are transmitted not only vertically downward but also laterally transverse of the frame and at angles thereto. As such, the pressures produce considerable strain on the means by which the carriage 20 is movably supported on the brackets 18. In conventional arrangements common to the art prior hereto, the provision was inadequate to bear these loads and unless an early replacement of the worn out carriage supporting means was contemplated, a supplemental means, which in itself tended to trap meat cutting debris, was used. The means, I shall now describe and which embodies my invention, is designed to withstand these forces without supplementation of any kind. In addition, such means provides for longer wear and a more sanitary apparatus.

The means to which I have alluded has a meat carriage channel plate 30 that may be suitably and permanently affixed to the brackets 18. The brackets 18 support the plate 30 in a substantially horizontal plane, projecting from the pedestal 10 and across that edge of the top plate 11 to which the slot 12 is most proximate. The channel plate 30 has a pair of lineally extending parallel side flanges 31 that are normal to the plate, projecting in a vertically upward direction relative thereto from edges thereof. Each flange 31 has a continuous lineally extending rim 32.

The rim 32 of each flange extends normal thereto and in a spaced, superimposed and parallel relation to the plate 30. Thus, each rim and its associated flange 31, viewed in end section, are of an inverted L appearance, with the inner surfaces 321 and 311 thereof and the thereto adjoining surface 301 of the plate 30 forming a closed channel-like track about which more will be said later herein.

To associate the carriage plate 20 with the channel plate 30, the carriage plate 20 has a carriage angle plate 40 affixed to the underside of the carriage plate. The carriage angle plate 40 has a flange 41 extending along each of the two parallel side edges of the angle plate 40. The flanges 41 are so formed as to be spaced from each other a distance that will allow the flanges 41, when the plate 40 is placed over the plate 30, to pass between and, in a sense, nest with edges of the rims 32 on the flanges 31. The flanges 41 are purposed to mount support and guide means embodied in bearing elements that engage the track surfaces 301, 311 and 321 of the channel plate 30.

Figure 2:
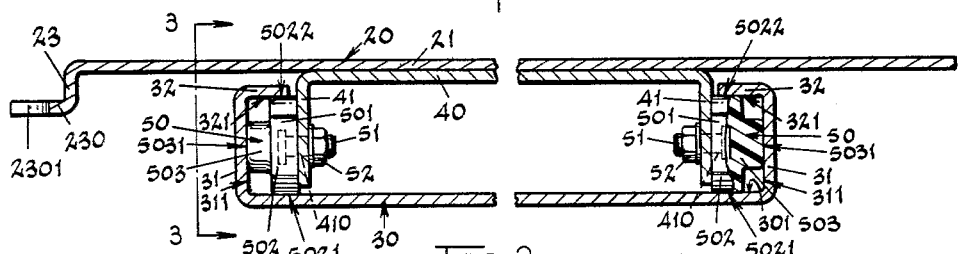
FIG. 2 is a view of an enlarged section taken along the plane of the line 2—2 indicated in FIG. 1.
Figure 3:
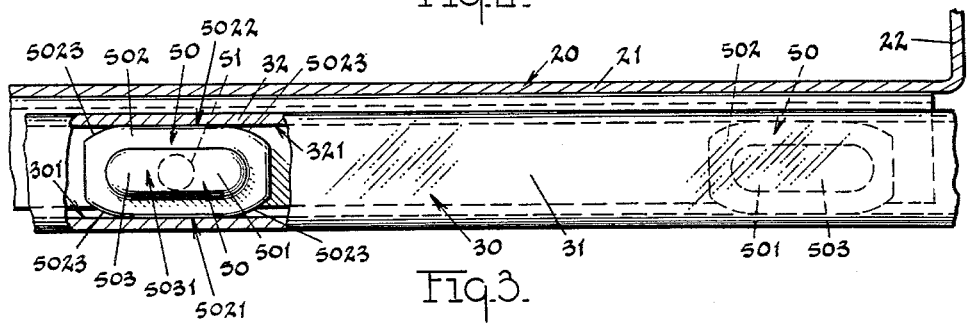
FIG. 3 is a view of a section taken along the plane of the line 3—3 indicated in FIG. 2.

The preferred form of bearing element embodying my invention is indicated at 50 shown in FIGS. 1 to 3 of the accompanying drawings and being formed, preferably, of a polyamide resin, such as nylon, having a characteristic of extreme toughness and therefore good abrasion resistance. The material, though a thermoplastic, should also be resistant to softening, except at high (above 250–300 degrees F.) temperatures. A nylon, such as that known to the trade as Zytel brand nylon and produced by E. I. du Pont de Nemours & Company, Wilmington, Delaware, serves very well in the situation.

Each bearing element 50 has a central core or body part 501 from which a shoulder part 502 extends and a cap part 503 protrudes. The body part 501 has means, such as a threaded stud 51, which cooperates with a like threaded nut 52 to connect the element 50 to the flange 41. It is desirable and contemplated that a plurality of elements 50, say two or more, will be connected to and mounted on each flange 41. Consequently each stud 51 of each element is purposed to pass through one of a plurality of openings 410 formed in each flange 41 at spaced points along the length thereof. The lineal spacing of the openings 410 are such as to permit the elements to give multiple point support of the feeder plate 20. The vertical disposition of the opening 410 is such that the shoulder and cap parts 502 and 503 slidably engage track surfaces of the channel plate 30.

As shown in the drawings, particularly FIGS. 2 and 3, the shoulder part 502 of each bearing element 50 extends radially from the body part 501 and has parallel and lineally extending bearing lower and upper edge surfaces 5021 and 5022. The bearing surface 5021 is adapted to slidably engage the plate surface 301 and the bearing surface 5022 slidably engages the rim surface 321. Thus, when movement of the feeder plate 20 is to be had, the bearing surfaces 5021 and 5022 slide on the plate and rim surfaces 301 and 321. Such vertical pressures, as may be exerted on the feeder plate 20, are thus transmitted by the shoulder part 502 of each bearing to the channel plate 30 and to the pedestal frame 10.

It is contemplated that all lateral pressures exerted on the plate 20 will be transmitted by the bearing element 50 to the frame 10. To that end the cap part 503 of the bearing element 50 has a bearing surface 5031 and each element 50 is so mounted on its respectively supporting flange 41 that the cap bearing surface 5031 slidably engages the surface 311 of flange 31. Such engagement limits lateral movement of the carriage plate 20 in any direction relative to the channel plate 30 and the saw blade 14 to that which is lineal toward and away from the cutting edge of the blade 14 and thus will produce a predetermined cutting plane on the meat being fed to the blade by the plate 20. Jamming or cocking of the carriage plate 20 with reference to the channel plate 30 is thus resisted. Also, the bearing surface 5031, as the drawings show, is separate and spaced from the bearing surfaces 5021 and 5022. This is advantageous in that heat, developing in consequence of the frictional sliding engagement of the individual surfaces, say 5021, will not become latent or accumulative to that developing in other of the surfaces, such as surface 5031.

The conjoint action of the bearing surfaces 5021, 5022 and 5031 just described is such as to overcome the pressures applied either directly or on the bias to the feeder carriage plate 20. This characteristic is truly new to systems of the kind here being described. Thus, operator applied pressures, which vary in their direction of application, as the carriage plate 20 is moved relative to the saw blade 14, may be withstood without strain or wear as heretofore.

Preferably, the shoulder part 502 of each bearing 50 is also formed to have inclined or cam surfaces 5023 at each of the opposite ends of each bearing surface 5021 and 5022. The cam surfaces 5023 lead into and merge, almost imperceptibly, with their associated bearing surfaces 5021 and 5022. Hence, much of a tendency, if there be any, of the bearing 50 to catch or seize onto the channel plate surfaces and to rotate about the horizontal central axis of the bearing is reduced. The bearing 50 may have a "built-in" lubricant capacity, such as that provided by impregnation with a material, like molybdenum disulphide, particularly in regions of the bearing at which the surfaces 5021, 5022 and 5031 occur.

Now it will be apparent that I provide by the multiple surface bearing, inherently or supplementarily lubricated, a means that will bear, within all practical operating limits and conditions, all the forces that may be expected to be applied to the feed carriage 20. Further, it must be also obvious that the bearing and the supporting and guiding system based on its use is remarkably free from pockets or zones into which contaminating meat cutting debris may lodge. And still further, that my construction may be easily, thoroughly and quickly cleaned must be now apparent. For these reasons, the National Sanitation Foundation, about which I have heretofore spoken, has accorded approval to embodiments of this structure.

Modifications of the bearing 50 just described take various forms. In FIGS. 4 and 5 of the accompanying drawings I show one such modified form in a bearing 60. The bearing 60, molded preferably, as is bearing 50, from nylon, has a body part 601, a relieved shoulder part 602 and a cap part 603. The body part 601 supports a threaded stud 61 that passes through a suitable opening, like one of the openings 401 in the flange 41, as when used in connection with the structure described of FIG. 1 of the drawings. The threaded stud 61 engages with a nut 62 to fix the bearing 60 in position on such flange.

The cap part 603 of the bearing 60, like the cap part 503 of bearing 50, has a bearing surface 6031 adapted to slidably engage a surface like the inner surface 311 of the flange 31 on channel plate 30. The shoulder part 602 of the bearing 60 has an annular surface 6021 that provides a journal to rotatably support a caster wheel 63. The wheel 63 has a rim 631 whose annular surface 6311 may engage and roll on a surface, such as the surface 301 of the channel plate 30. The wheels 63 of the modified structure bearings 60 are capable of supporting the carriage plate 20 for ready mobility, forwardly and backwardly relative to the saw blade 14. Tendency, however, of the plate 20 to move transverse or on a bias to such regular path is resisted by the sliding engagement of the cap part surface 603 with the flange surface 310 of the channel plate 30.

Another modification is embodied in a bearing 70 shown in FIGS. 6 and 7 of the drawings. The bearing 70, also formed from nylon, has a body part 701 in which a threaded stud 71 is embedded. The stud 71, cooperating with a nut 72, is adapted to mount the bearing 70 on one of the flanges 41, in the manner explained in connection with mounting bearings 50 and 60.

The body part 701 of the bearing 70 has a cap part 703 whose surface 7031 is positioned, in the mounting of the bearing 70 on a flange 41, to slidably engage the surface 311 on the flange 31, when so assembled. Such engagement resists lateral pressures exerted on the carriage 20 and effectually maintains the carriage to a single path of reciprocation relative to the cutting edge of the band saw blade 14. Movement in that path is facilitated by a plurality of caster wheels 73 supported on suitable journals 74 also mounted on the flanges 41 in spaced relation to the points at which the bearings 70 are mounted. The wheels 73 rotatably engage and track over surfaces, like the surface 301 on the channel plate 30, and thus support the carriage plate 20 for desired free reciprocation relative the meat cutting saw blade 14.

It will be observed that, the modified forms, just as in the preferred form of structure shown in FIGS. 1 and 3, the debris catching central channel track of the prior art has been eliminated, without sacrifice of control or resistance to forces exerted on the meat carriage transversely or on the bias to its normal and desired path of travel. Thus, my invention teaches a way by which the desired sanitary and operating ends may be both satisfactorily served.

I claim:
1. A meat saw carriage guide system for a power operated meat saw having
   a frame,
   a band saw movably mounted thereon,
   and a movable meat supporting saw carriage
and comprising, in combination with
   a track supported on the frame having
   a pair of lineally extending parallel and contiguous bearing surfaces,
   one of which extends through a horizontal plane and the other of which extends through a vertical plane,
   a caster wheel on and rotatably supported by the meat supporting saw carriage in a position to rollingly engage only the horizontal extending track bearing surface and
   a polyamide bearing on and supported by the meat supporting saw carriage in a position to slidably engage only the vertical extending track bearing surface
   thus to prevent lateral movement of the meat supporting saw carriage transverse the line of lineal extension of the track and consequent binding engagement of the caster wheel with the vertical extending track bearing surface.

2. A meat saw carriage guide system, as described in claim 1 in which
   said caster wheel and said polyamide bearing are supported on the meat supporting saw carriage in a spaced relation to each other along a line coincidental with the lineal extension of the track and a lateral extension of the meat supporting saw carriage.

References Cited by the Examiner

UNITED STATES PATENTS

| | | | |
|---|---|---|---|
| 1,643,829 | 9/1929 | Biro. | |
| 2,573,272 | 10/1951 | Petkwitz | 308—3.6 X |
| 2,585,957 | 2/1952 | Meeker et al. | 143—25 X |
| 2,606,091 | 3/1952 | Buchy et al. | 308—3.6 X |
| 2,617,693 | 11/1952 | Stafford | 308—3.6 |
| 2,856,972 | 10/1958 | Burch | 143—25 |

DONALD R. SCHRAN, *Primary Examiner.*